United States Patent [19]

Kolpak

[11] Patent Number: 5,524,665

[45] Date of Patent: Jun. 11, 1996

[54] LEVEL CONTROL SYSTEM FOR GAS-LIQUID SEPARATORS

[75] Inventor: Miroslav M. Kolpak, Dallas, Tex.

[73] Assignee: Atlantic Richfield Company, Los Angeles, Calif.

[21] Appl. No.: 311,983

[22] Filed: Sep. 26, 1994

[51] Int. Cl.[6] ........................................... B01D 17/00
[52] U.S. Cl. ............................... 137/173; 137/188
[58] Field of Search ........................... 137/173, 188

[56] References Cited

U.S. PATENT DOCUMENTS 4,852,395  8/1989  Kolpak ........................... 73/61.1 R
5,205,310  4/1993  Kolpak et al. ..................... 137/2

Primary Examiner—Gerald A. Michalsky
Attorney, Agent, or Firm—Drude Faulconer

[57] ABSTRACT

A gas-liquid separator system having a control system for controlling and maintaining a "normal" liquid level in the separator vessel. The system is capable of operating without the need for external power (e.g. electric, etc.) or the need for process gas to operate the valves. Also, the system is "fail safe" since the control valves for both the gas and liquid from the vessel will be in an open position if the control system fails. The system has control valve units on both the liquid and the gas outlets of the vessel. Each control valve unit is basically similar in constructon and has a valve element moveable between an open and a closed position by changes in differential pressure across a diaphram. The valve units are connected to the vessel and to each other to sense and response to any changes in the differential pressure between the top and the bottom of the vessel to open or close the respective valves to maintain or to reattain the normal level in the vessel.

15 Claims, 2 Drawing Sheets

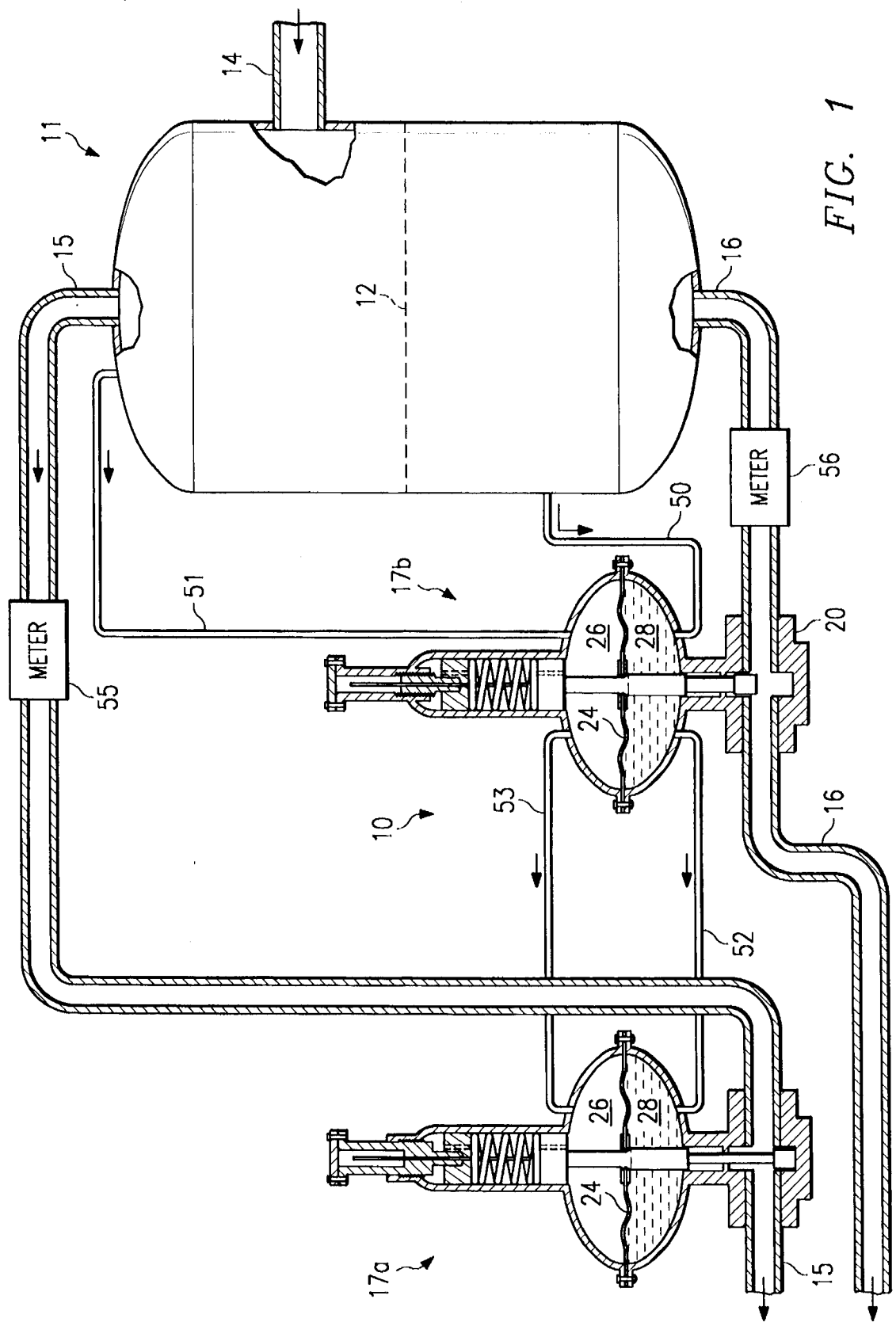

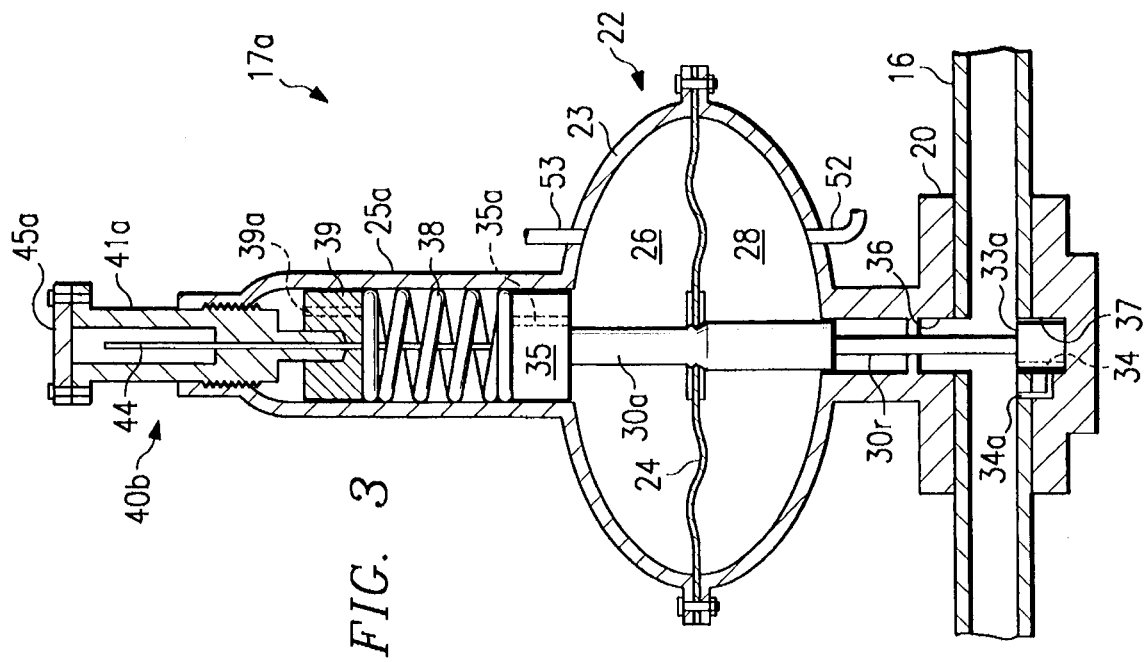
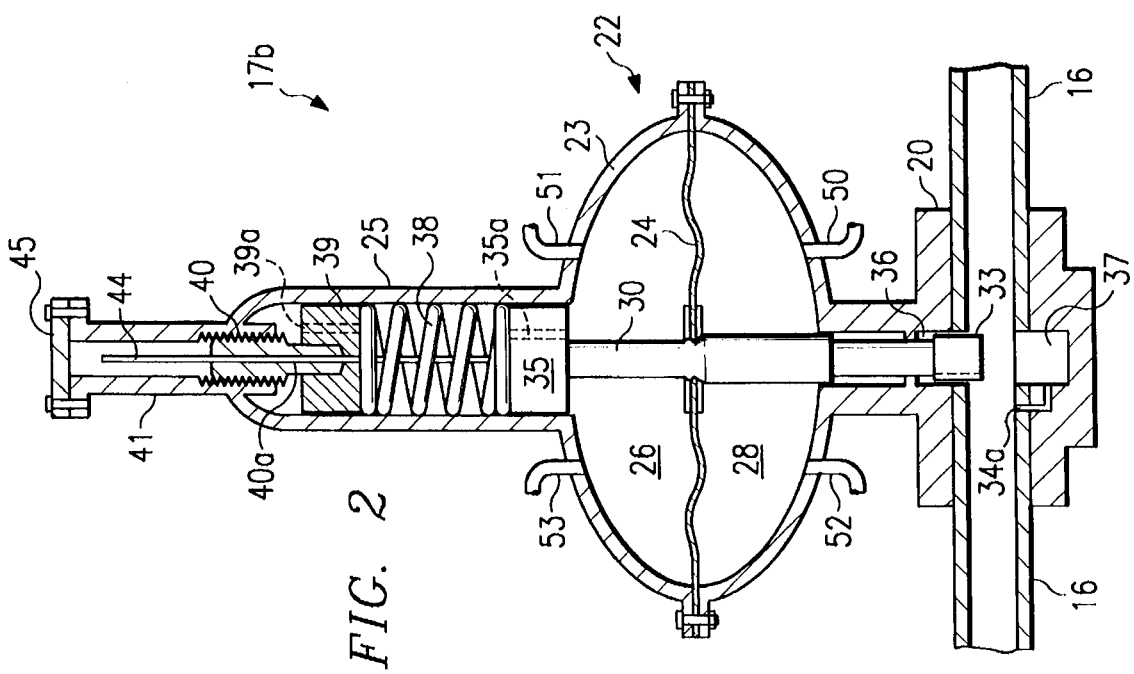

LEVEL CONTROL SYSTEM FOR GAS-LIQUID SEPARATORS

1. Technical Field

The present invention relates to a level control system for gas-liquid separators and in one aspect relates to the use of dual regulators to control of the flow of both liquid and gas from a gas-liquid separator to control the level of liquid therein without the need for any remote or external power source.

2. Background Art

In producing hydrocarbons, it is common to produce a multiphase fluid stream which has to be separated. For example, it is not unusual to separate the gas in a multiphase stream from the liquid hydrocarbons therein in order to meter the flow rates of the respective fluids from the well. This is typically done by flowing the stream into a separator vessel in which the stream is retained for a defined residence time in order to allow gravity separation of the respective fluids.

For gravity separators of this type to function as designed, it is vitally important, if not critical, to maintain the level of the liquid hydrocarbons to be carefully and accurately maintained at a prescribed height within the separator vessel; e.g. see U.S. Pat. Nos. 4,852,395 and 5,205,310.

There are several known systems for controlling the liquid level within a gravity separator vessel. These normally include in some form or another (1) a back-pressure regulator on the gas outlet line; (2) a throttling or snap acting valve on the liquid outlet line; (3) a level sensing means, such as a bridle float or internal float; and (4) a pneumatically- and/or an electrically-operated means to actuate the valve in response to a signal from the sensor.

While such control systems work well and have good track records, they also have some disadvantages. For example, they are relatively complicated and can be expensive to construct and maintain. Further, it is not all that uncommon for these systems to malfunction and allow the separator vessel to become flooded with liquid whereupon the liquid enters the gas outlet and seriously affects the operation of the vessel. Still further, and very important, these control systems normally require external power (e.g. electric), especially in those environments where venting of the process gas is not permitted for ecological or other reasons. Accordingly, level control systems of this type can be very expensive to install and maintain, especially in remote, normally-unmanned production areas.

Also, these prior level control systems are "set" for operation by setting the gas line back-pressure regulator to always exert a constant pressure drop across the gas outlet line (e.g. 15–30 psia). The liquid line valve is routinely set at a less than full-open position so that there is some reserve in case a liquid slug or other "upset" occurs in the separator vessel. Because the liquid outlet valve is not fully open under normal operating conditions, often an unnecessary, excessive back-pressure is exerted on the incoming production stream and hence, on the producing well, itself, thereby adversely affecting the production from the well.

Accordingly, there is a continuing need to improve liquid level control systems for high-pressure separators while reducing their costs. Also, remote areas require a liquid level control system which is capable of operating without external power (e.g. electrical or instrument air) or even without the use of process gas since the necessary venting of this gas may be hazardous or prohibited by environment considerations.

SUMMARY OF THE INVENTION

The present invention provides a gas-liquid separator system and a control system for controlling and maintaining a predetermined liquid level in the separator vessel. The present system is especially useful in remote location where the liquid level control system is capable of operating without the need for external power (instrument air, electric, etc.) or the need for process gas to operate conventional valves since the venting of this gas could be hazardous or ecologically undesirable. Also, the present system does not produce any substantial back-pressure on the separator vessel which inherently improves the flowrate of any production well being serviced by the separator system. Further, the present system is "fail safe" in that the liquid level control system fails, the valves which control flow through both the gas and the liquid outlets will be moved to and/or maintained in an open position, thereby alleviating the possible flooding or rupturing of the separator vessel.

More specifically, the present invention relates to a gas-liquid separator system comprising a gas-liquid separator vessel having an inlet and a gas outlet conduit and a liquid outlet conduit. A control system is provided for controlling the level of liquid in the vessel which comprises a liquid valve unit fluidly connected in the liquid outlet conduit of the vessel and a gas control valve unit fluidly connected in the gas outlet conduit of the vessel.

The control valve units are basically similar in construction. Each is comprised of a housing having a valve element therein which allows flow through its respective fluid conduit when in an open position and which blocks flow through that conduit when in a closed position. A pressure-responsive means (e.g. a diaphram) within said housing effectively divides the housing into an upper chamber and a lower chamber. The diaphram is attached to the valve element wherein a change in the differential pressure across the diaphram will move the valve element between its respective positions.

The diaphram in the liquid control valve unit functions to (a) maintain the valve element in its open position while the liquid in the vessel is at a desired level and (b) move the valve element towards its closed position when the level of the liquid in the vessel drops below said predetermined level while the diaphram in the gas control valve unit functions to (a) maintain its valve element in the open position while said liquid is at or above a desired level in said vessel and (b) move the valve element towards its closed position when the level of the liquid in the vessel rises above said predetermined level.

A liquid sensor conduit fluidly connects said lower chamber of said liquid control valve unit to the lower portion of the gas-liquid separator vessel wherein the pressure due to the head of liquid in the separator is applied to the lower side of the diaphram in the liquid control valve unit. A gas sensor conduit fluidly connects the upper chamber of the liquid control valve unit to the upper portion of said gas-liquid separator vessel wherein the gas pressure in the vessel is applied to the upper side of the diaphram. The upper chambers of both the liquid and the gas control valve units are fluidly connected together by a pressure equalizing conduit while the lower chambers of the control valve units are fluidly connected together by another pressure equalizing conduit.

Each control valve unit includes a means, e.g. an adjusting screw, for adjusting each valve element whereby both valve elements will be in an open position when the liquid in said gas-liquid separator vessel is at the predetermined or "normal" level. Also, each valve unit has a means, e.g. a coil spring, for normally biasing the diaphragm, in a downward direction in the housing; the bias of which is also adjusted by the adjusting screw. The bias of the spring is adjusted in relation to the differential pressure required across the diaphram to maintain the valves in an open position when the liquid level is normal and to move the respective valve elements towards their closed positions when an "upset" occurs in the vessel. Also, the springs will move or maintain the valve elements in a "fail safe" open position if either or both of the diaphrams fail.

As long as the conditions in vessel 11 are "normal" (i.e. separation is taking place in such a manner that the liquid remains substantially at the normal level), the gas pressure within the vessel will be applied through gas sensor line to the upper chamber of the liquid valve unit while liquid pressure will be applied to the lower chamber of the liquid valve unit to develope the differential pressure across the diaphram necessary to maintain valve element in a fully open position. Basically, the same differential pressure will exist across the diaphram of the gas valve unit since the respective upper and lower chambers of the respective valve units are fluidly connected to each other. This differential pressure also maintains the valve element in the gas control valve unit in an open position whereby both gas and liquid can flow from the vessel at a rate necessary to maintain the liquid level at a predetermined height.

However, upon an "upset" in vessel (i.e. the liquid level either rises above or falls below the normal level, plus or minus a tolerence factor), both valve units will interreact to correct the situation and bring the liquid level back to normal. For example, if liquid starts to build up in vessel, the pressure due to the head of liquid in vessel will increase thereby increasing the pressures in the lower chambers of both the control valve units.

This increase in pressure increases the upward-acting differential pressure on the respective diaphrams which tends to move the diaphrams, hence the valve elements, upward in the housing. This movement keeps the valve element in the liquid valve unit in its open position while moving the valve element in the gas valve unit towards its closed position. Upon the closing of gas control valve, the gas pressure begins to build in the vessel which, in turn, increases the flow of liquid from the vessel through the liquid outlet conduit.

When the increased flow of liquid drops the liquid level back to the normal level, the pressure due to the head of liquid in vessel will decrease so that the pressures in lower chambers will also decrease, thereby allowing the respective diaphrams to move downward in their respective valve units towards their original positions which again opens the gas valve element.

If the liquid drops below the normal level 12, the pressures in the lower chambers decrease which creates a positive, differential pressure in a downward direction. This differential pressure, along with the compressional force in the springs, will move the respective diaphrams downward to maintain the gas valve open while move moving the valve element in the liquid valve unit towards its closed position. Once flow through the liquid outlet of the vessel is blocked, liquid will begin to accumulate and rise in vessel until the normal level whereupon the respective diaphrams will move upward to reopen and/or maintain the valves in their open positions.

BRIEF DESCRIPTION OF THE DRAWINGS

The actual construction, operation, and apparent advantages of the present invention will be better understood by referring to the drawings, which are not necessarily to scale, in which like numerals refer to like parts and in which:

FIG. 1 is an elevational view, partly in section, of a separator vessel having the level control system of the present invention incorporated therewith;

FIG. 2 is an enlarged, detailed sectional view of a fluid control valve unit such as used in the system of FIG. 1; and FIG. 3 is an enlarged, detailed sectional view of a further embodiment of a fluid control valve unit in accordance with the present invention.

BEST KNOWN MODE FOR CARRYING OUT INVENTION

Referring now more particularly to the drawings, FIG. 1 illustrates a gas-liquid separator 11 having the level control system 10 of the present invention incorporated therein. Vessel 11 has an inlet conduit 14 for admitting a multiphase fluid stream (gas and liquid) from a source such as a hydrocarbon-producing well or the like (not shown). Separator vessel 11 may be of any general type wherein a gas-liquid stream is gravity-separated and in which it is desired to accurately control the liquid level therein; e.g. see the separator vessel disclosed in U.S. Pat. No. 4,852,395.

In such a vessel, the fluid stream from inlet 14 may be caused to flow through a spiral path as it enters the vessel to thereby induce centrifugal forces on the stream which aid in separating the liquid from the gas. Under the effects of gravity, the separated gas flows to the top of vessel 11 while the liquid accumulates in the bottom thereof. The gas will exit vessel 11 through gas outlet conduit 15 while the liquid will exit through liquid outlet conduit 16.

Control valve units 17a and 17b are fluidly connected to gas outlet conduit 15 and liquid outlet conduit 16, respectively, to control the flow of the respective fluids therethrough and to thereby control the level of the liquid in vessel 11 at a predetermined height as represented by the dotted line 12 in FIG. 1. This level can be manually observed by an appropriate sight gauge (not shown). Control valve units 17a and 17b are similar in construction and operation and only vary slightly as will be detailed below. In the following description, components found in both of the valve units will be identified by the same numbers for the sake of clarity.

Referring now to FIG. 2, as illustrated, liquid control valve 17b is comprised of a valve housing 20 having an actuator housing 22 effectively integral therewith. Valve housing 20 is threadingly connected or otherwise fluidly connected into liquid outlet line 16. While actuator housing 22 can take various configurations, the lower part 23 of housing 22 is preferably ellipsoidal-shaped (especially where the valve unit is to be used with high-pressure, gas-liquid separators) which can be made in two parts and then bolted or otherwise secured together. A flexible diaphram 24 is attached to the inner periphery of actuator housing 22 to effectively divide the interior of housing 22 into an first chamber (e.g. upper chamber 26) and a second chamber (lower chamber 28) for a purpose to be discussed below. As used herein, the terms "up", "upper", "down", "lower", etc. are meant to be relative terms and are used to describe the relative elements and movements of the valve units as they are illustrated in the drawings but such elements and movements would be inverted if the present valve unit is used in an inverted position, as is possible in some applications.

A valve shaft 30 passes through the center of diaphram 22 and is attached thereto so that shaft 30 will be moved up or down upon corresponding movement of diaphram 24. Shaft 30 carries a valve element 33 at its lower end (shown in partially-open/closed position in FIG. 2) and a cylindrical head 35 (having "weep hole" 35a therethrough) at its upper end; the latter being slidably positioned in the upper cylindrical portion 25 of actuator housing 22. A spline-slot arrangement (not shown) or equivalent between head 35 and the interior of portion 25 prevents relative rotation therebetween.

Valve element 33 can be of any configuration which will fully block flow through outlet conduit 16 when fully positioned therein, e.g. a "paddle"-shaped element having a diameter substantially equal to the diameter of conduit 16. Valve housing 20 has a recess 36 therein into which valve element 33 is retracted when in a full open position and a diametrically-opposed recess 37 therein for a purposed to be discussed below.

A coil spring 38 is positioned between head 35 of shaft 30 and a piston 39 (having "weep hole" 39a therethrough) which is slidably mounted in cylindrical portion 25. Adjusting screw 40 (having a longitudinal bore 40a therethrough) is threaded within an extension 41 of cylindrical portion 25 and engages piston 39 for a purpose to be described below. A valve position indicator rod 44 is attached to head 35 on valve shaft 30 and extends upward through bore 40a in piston 40 where its position can be observed within extension 41. Preferably, rod 44 is threaded into head 35 so it can be removed after the valve unit has been adjusted or "set" as will be described below. The upper end of extension 41, hence the upper end of actuator housing 22, is closed and sealed with blind flange 45 or the like which screwed or bolted in place.

Gas valve unit 17a disclosed in FIG. 3 is basically the same as that just described above in relation to FIG. 2 except (10 valve shaft 30a and (2) the adjusting screw 40a. Valve shaft 30a has a reduced portion 30r which extends across gas outlet conduit 16 when the valve is in an open position. Valve element 33a is carried on the lower end of the reduced shaft 30r and is received into recess 37 of valve housing 20 when the valve is in its open position. Even though the reduced shaft 30r partially restricts gas flow through conduit 16 when the valve is open, this small restriction is inconsequential in the overall operation of the present control system. Valve element 33a may have a weep hole 34 therethrough or a by-pass passage 34a can be provide to allow any fluid which may be otherwise trapped in recess 37 ahead of valve 33a to exit the recess as valve element 33a enters.

Adjusting screw 40b which is integral with the extension 41a which, in turn, is threaded into the upper portion 25a of actuator housing 22. Blind flange 45a can be removed so that indicator rod 44 can be observed while adjusting screw 40b is threaded into or out of portion 25a to adjust the position of the valve and the tension of spring 38. This allows adjustment of the valve without the need for special tools. Of course, an O-ring seal (not shown) or the like can be properly positioned between screw 40c and the housing if considered necessary.

Referring again to FIG. 1, control valve unit 17b is fluidly connected into liquid outlet conduit 16 and valve unit 17a is fluidly connected into gas outlet conduit 15. Liquid sensor conduit 50 is connected between the lower (liquid) portion of separator vessel 11 and the lower chamber 28 in valve unit 17b while gas sensor conduit 51 is connected between the upper (gas) portion of vessel 11 and the upper chamber 26 of valve unit 17b. Lower chamber 28 of valve unit 17b is fluidly connected to lower chamber 28 of valve unit 17a by line 52 while the upper chambers 26 of the valve units are fluidly connected together by line 53.

Where it is desirable to separately measure the flow of gas and liquid from separator vessel 11, a standard gas flow meter 55 is fluidly connected into gas outlet conduit 15 and a standard liquid flow meter 56 is fluidly connected into liquid outlet conduit 16, preferably upstream of their respective valve units 17b, 17a.

With the construction of the present system having been set forth in detail above, the operation of the level control system of the present invention will now be described. Basically, the pressure differential between the upper chambers 26 and the lower chambers 28 in the respective valve units will effect the position of the respective diaphrams 24 and hence, the valve elements 33. In order for the valves to perform as desired, both of the valve units 17a, 17b must be "set" so that the respective diaphrams in the valve units will be in their proper positions to insure that the valve element 33 in one valve unit will be completely open when its respective phase (gas or liquid) is overfilling separator vessel 11 while the valve element in the other unit will be completely closed.

To set the respective valves, separator vessel 11 is filled with liquid (i.e. same as that in the stream to be separated) to a "normal" level 12, FIG. 1. The blind flanges 45, 45a are removed from each valve units 17b, 17a and a hollow-shafted, winged screwdriver (not shown) or the like is lowered around a respective indicator rod 44 and into engagement with adjusting screw 40. Screw 40 is threaded up or down until indicator rod 44 of valve unit 17b indicates that valve element 33 is retracted into recess 36 in valve housing 20 and rod 44 of valve unit 17a indicates that valve element 33a is positioned within recess 37 whereby each valve will be in its full open position. At this position, there will be a positive, upward differential pressure across diaphram 24 that will compress spring 38 sufficiently to maintain the respective valves in their open positions.

As long as the conditions in vessel 11 are "normal" (i.e. separation is taking place in such a manner that the liquid remains substantially at level 12), gas will flow through gas sensor line 51 into chamber 26 of liquid valve unit 17b and liquid will flow through liquid sensor line into chamber 28 of unit 17b to produce a differential pressure across diaphram 24 which compensates for the compression in spring 38 and which holds diaphram 24 in a relatively stable position which, in turn, maintains valve element 33 of unit 17b in a fully open position.

Further, the differential pressure across diaphram 24 of gas valve unit 17a will also be substantially the same as that in unit 17b since the chambers 26 and 28 of the respective valve units 17a, 17b are connected by lines 53, 52, respectively. Accordingly, valve element 33 of unit 17b will also be held in an open position. Accordingly, both gas and liquid can flow from the vessel 11 at a rate to maintain the liquid level 12 at a predetermined height.

However, upon an "upset" in vessel 11 (i.e. the liquid level either rises above or falls below normal level 12, plus or minus a tolerence factor), valve units 17b, 17a will interreact to correct the situation and bring the liquid level back to normal. For example, if liquid starts to build up in vessel 11 and rises to an unacceptable level above normal level 12, the pressure due to the head of liquid in vessel 11 will increase. Since chambers 28 of both control valve units 17b and 17a is fluidly connected to vessel 11 via liquid sensor lines 50, 52, the pressure in both chambers 28 will accordingly increase.

This increase in pressure increases the upward-acting differential pressure on the respective diaphrams in units 17b and 17a which tends to move the diaphrams, hence valve shafts 30, 30a, upward. In the case of liquid valve unit 17b, valve shaft 30 can not move upward since it is already at its upper limit but the increase in pressure insures that valve element 33 remain in its open position. The increase in pressure across diaphram 24 in gas control valve unit 17a causes valve shaft 30a, 30r and valve element 33a to move upward to close flow through gas outlet conduit 15. Upon the closing of gas control valve unit 17a, the gas pressure begins to build in vessel 11 which, in turn, will increase the flow of liquid from the vessel through liquid outlet conduit 16.

When the increased flow of liquid drops the liquid level back to normal level 12, the pressure due to the head of liquid in vessel 11 will decrease so that the pressures in chambers 28 will also decrease, thereby allowing the diaphrams 24 to move downward in their respective valve units to again open gas valve element 33a.

If the liquid drops below level 12 in vessel 11, the pressures in chambers 28 decrease which creates a positive, differential pressure in a downward direction. This differential pressure, along with the compressional force of spring 38, will move the respective diaphrams 24 downward. Again, this downward movement has no effect on gas valve 33a since it is already at its downward limit but will cause shaft 30 and valve element 33 in the liquid valve unit 17b to move to its closed position. Once liquid flow through outlet 16 is blocked, liquid will begin to accumulate and rise in vessel until level 12 is reached and the head of liquid again applies the necessary pressures to chambers 28 to overcome the bias of springs 38 and create the differential pressure necessary to move the diaphrams upward to reopen and/or maintain the valves in their open positions.

The present liquid level control system has an added "fail safe" feature in that if either or both of the diaphrams 24 rupture or fail during operation, the respective springs 38 in the valve units will force the respective valve shaft downward to thereby move that valve element to its open position. This is important, especially in remote, unmanned locations where the present invention is likely to be used. That is, if a diaphram fails, flow of both the liquid and gas can continue from the high-pressure separator vessel 11 until corrective action can be taken thereby alleviating the possibility of flooding or "blowing-up" as might happened if the valve on either the liquid or gas outlet conduits remained in a closed position for an extended length of time.

What is claimed is:

1. A control system for controlling the level of liquid in a gas-liquid separator vessel having a liquid outlet conduit and a gas outlet conduit; said control system comprising:

a liquid valve unit fluidly connected in said liquid outlet conduit, said unit comprising:
      a housing;
      a valve element in said housing which allows flow through said liquid conduit when in an open position and which blocks flow through said liquid outlet conduit when in a closed position; and
      pressure-responsive means (a) for maintaining said valve element in open position while said liquid is at a desired level in said vessel and (b) for moving said valve element towards said closed position when the level of the liquid in the vessel drops below said predetermined level; and a gas valve unit fluidly connected in said gas outlet conduit, said unit comprising:
      a housing;
      a valve element in said housing which allows flow through said gas conduit when in an open position and which blocks flow through said gas outlet conduit when in a closed position; and
      pressure-responsive means (a) for maintaining said valve element in said open position while said liquid is at or above a desired level in said vessel and (b) for moving said valve element towards said closed position when the level of the liquid in the vessel rises above said predetermined level.

2. The control system of claim 1 wherein said pressure-responsive means of said liquid valve unit comprises:

a diaphram mounted in said housing and defining an upper and a lower chamber therein; and means for connecting said valve element to said diaphram whereby movement of said diaphram will move said valve; and wherein said pressure-responsive means of said gas valve unit comprises:

a diaphram mounted in said housing and defining an upper and a lower chamber therein; and means for connecting said valve element to said diaphram whereby movement of said diaphram will move said valve.

3. The control system of claim 2 including:

a liquid sensor conduit adapted to fluidly connect said lower chamber of said liquid control valve unit to the lower portion of said gas-liquid separator vessel; and a gas sensor conduit adapted to fluidly connect said upper chamber of said liquid control valve unit to the upper portion of said gas-liquid separator vessel.

4. The control system of claim 3 including:

a conduit for fluidly connecting said upper chamber of said liquid control valve unit to said upper chamber of said gas control valve unit; and a conduit for fluidly connecting said lower chamber of said liquid control valve unit to said lower chamber of said gas control valve unit.

5. The control system of claim 4 including:

means for adjusting said valve element of said liquid control valve unit to a position at which said valve element will be open when liquid in said gas-liquid separator vessel is at a predetermined level; and means for adjusting said valve element of said gas control valve unit to a position at which said valve element will be open when liquid in said gas-liquid separator vessel is at a predetermined level.

6. The control system of claim 5 wherein said pressure-responsive means of said liquid control valve unit further comprises:

means in said housing for normally biasing said diaphram downward in said housing; and wherein said pressure-responsive means of said gas control valve unit further comprises:

means in said housing for normally biasing said diaphram downward in said housing.

7. The control system of claim 6 wherein said means for biasing said diaphram in said liquid control valve unit comprises a spring; and wherein said means for biasing said diaphram in said gas control valve unit comprises a spring.

8. The control system of claim 5 wherein said means for adjusting said valve element in said liquid control valve unit comprises:

an adjusting screw threadingly connected in said housing and positioned to adjust the compression in said spring when threaded into or out of said housing; and wherein said means for adjusting said valve element in said gas control valve unit comprises:

an adjusting screw threadingly connected in said housing and positioned to adjust the compression in said spring when threaded into or out of said housing.

9. A gas-liquid separator system comprising:

a gas-liquid separator vessel having an inlet and a gas outlet conduit and a liquid outlet conduit;

a control system for controlling the level of liquid in said gas-liquid separator vessel, said control system comprising:

a liquid valve unit fluidly connected in said liquid outlet conduit, said unit comprising:

a housing;

a valve element in said housing which allows flow through said liquid conduit when in an open position and which blocks flow through said liquid outlet conduit when in a closed position; and pressure-responsive means (a) for maintaining said valve element in said open position while said liquid is at a desired level in said vessel and (b) for moving said valve element towards said closed position when the level of the liquid in the vessel drops below said predetermined level; and a gas valve unit fluidly connected in said gas outlet conduit, said unit comprising:

a housing;

a valve element in said housing which allows flow through said gas conduit when in an open position and which blocks flow through said gas outlet conduit when in a closed position; and pressure-responsive means (a) for maintaining said valve element in said open position while said liquid is at or above a desired level in said vessel and (b) for moving said valve element towards said closed position when the level of the liquid in the vessel rises above said predetermined level.

10. The gas-liquid separator of claim 9 wherein said pressure-responsive means of said liquid valve unit comprises:

a diaphram mounted in said housing and defining an upper and a lower chamber therein; and means for connecting said valve element to said diaphram whereby movement of said diaphram will move said valve; and wherein said pressure-responsive means of said gas valve unit comprises:

a diaphram mounted in said housing and defining an upper and a lower chamber therein; and means for connecting said valve element to said diaphram whereby movement of said diaphram will move said valve.

11. The gas-liquid separator system of claim 10 including:

a liquid sensor conduit adapted to fluidly connect said lower chamber of said liquid control valve unit to the lower portion of said gas-liquid separator vessel; and a gas sensor conduit adapted to fluidly connect said upper chamber of said liquid control valve unit to the upper portion of said gas-liquid separator vessel; and a conduit for fluidly connecting said upper chamber of said liquid control valve unit to said upper chamber of said gas control valve unit; and a conduit for fluidly connecting said lower chamber of said liquid control valve unit to said lower chamber of said gas control valve unit.

12. The gas-liquid separator system of claim 11 including:

means for adjusting said valve element of said liquid control valve unit to a position at which said valve element will be open when liquid in said gas-liquid separator vessel is at a predetermined level; and means for adjusting said valve element of said gas control valve unit to a position at which said valve element will be open when liquid in said gas-liquid separator vessel is at a predetermined level.

13. The gas-liquid separator system of claim 12 wherein said pressure-responsive means of said liquid control valve unit further comprises:

means in said housing for normally biasing said diaphram downward in said housing; and wherein said pressure-responsive means of said gas control valve unit further comprises:

means in said housing for normally biasing said diaphram downward in said housing.

14. The gas-liquid separator system of claim 13 wherein said means for adjusting said valve element in said liquid control valve unit comprises:

an adjusting screw threadingly connected in said housing and positioned to adjust the position of said diaphram when threaded into or out of said housing; and wherein said means for adjusting said valve element in said gas control valve unit comprises:

an adjusting screw threadingly connected in said housing and positioned to adjust the position of said diaphram when threaded into or out of said housing.

15. The gas-liquid separator system of claim 14 including:

a gas flow meter in said gas outlet conduit between said vessel and said gas control valve unit; and a liquid flow meter in said liquid outlet conduit between said vessel and said liquid control valve unit.

* * * * *